(12) United States Patent
Fitzemeyer

(10) Patent No.: US 6,283,382 B1
(45) Date of Patent: Sep. 4, 2001

(54) RADIANT HEATING SYSTEM PIPE MOUNTING PLATE

(76) Inventor: Michael Fitzemeyer, 117 Maple St., Malden, MA (US) 02148

( * ) Notice: Subject to any disclaimer, the term of this patent is extended or adjusted under 35 U.S.C. 154(b) by 0 days.

(21) Appl. No.: 09/639,241

(22) Filed: Aug. 15, 2000

(51) Int. Cl.$^7$ .................................................. F24D 5/10
(52) U.S. Cl. .............................................. 237/69; 165/49
(58) Field of Search .................... 237/69, 56; 165/56, 165/49, 168

(56) References Cited

U.S. PATENT DOCUMENTS

| | | | |
|---|---|---|---|
| 3,366,170 | * | 1/1968 | Hans-Joachim Weiz ............... 237/69 |
| 4,172,444 | * | 10/1979 | Atkinson ............................. 126/466 |
| 4,369,836 | * | 1/1983 | Bleckmann ......................... 165/171 |
| 4,635,710 | * | 1/1987 | Shelly .................................. 165/49 |
| 5,292,065 | | 3/1994 | Fiedrich . |
| 5,579,996 | | 12/1996 | Fiedrich . |
| 5,799,723 | * | 9/1998 | Sokolean ............................. 165/49 |

OTHER PUBLICATIONS

Wirsbo Radiant Heating Product Brochure (1998).

* cited by examiner

*Primary Examiner*—Harold Joyce
*Assistant Examiner*—Derek S. Boles
(74) *Attorney, Agent, or Firm*—Morse, Altman & Martin

(57) ABSTRACT

A mounting plate for securing the heating pipe of a radiant heat system to the subfloor. The plate is a flat sheet with a groove in the upper surface and a plurality of legs underneath. The plate is composed of a rigid and highly heat-conductive material, preferably aluminum and aluminum alloys. The legs form large air gaps which can be left empty or filled with insulation to raise the efficiency of the system. The groove runs from one edge of the plate to another. The bottom of the groove is preferably semicircular, with a diameter the same as the outside diameter of the pipe so that heat transfer is maximized. The pipe is retained in the groove by a ridge running the length of the groove or by forming the groove in an omega shape so that the pipe must be snapped into the groove.

24 Claims, 7 Drawing Sheets

RADIANT HEATING SYSTEM PIPE MOUNTING PLATE

BACKGROUND OF THE INVENTION

1. Field of the Invention

The present invention relates to heating systems, more particularly, to radiant heating systems for commercial and residential buildings.

2. The Prior Art

Radiant heating systems are alternatives to the conventional heating systems such as forced hot air, radiators, and baseboards. The typical radiant heating system consists of a boiler for heating water, a pump, a supply pipe, a flexible heating pipe embedded throughout the floor of the room to be heated, a return pipe, and a thermostat for regulating the boiler. Heated water is pumped from the boiler, through the supply pipe, the heating pipe, and the return pipe back to the boiler. These systems have several advantages over other heating systems. They provide uniform heat to the room. In other words, the source of the heat is not localized, like with a forced hot air, radiator, or baseboard system. And because of this, the heating water only has to be heated to a temperature that is a bit above the desired room temperature. For example, if the desired room temperature is 70° F., the water may only have to be heated to about 90° F., depending upon the outside temperature, as opposed to 180° for other heating systems.

There are several methods in the prior art for installing the pipe for a radiant heating system. In the method shown in FIG. 2, the pipe 20 is laid out on the subfloor 22 in a zigzag pattern to cover the entire room. Then concrete or other hardening underlayment 24 is poured over the pipes 20 to a depth of typically about one to two inches. After the underlayment 24 hardens, securing the pipes 20 in place, the flooring 26 is put down. As the heated water heats the underlayment 24, the heat disperses through the underlayment 24 so that the upper surface 28 of the underlayment 24 is uniformly warm, radiating heat uniformly throughout the room.

One shortcoming of this methods is that it is time-consuming to install. The pipes 20 must be laid out by hand, with the correct or desired spacing, and secured in place, a time consuming and relatively exacting process. Then the underlayment 24 must be poured, which takes time to set. Another shortcoming is that the pipes 20 are in direct contact with the subfloor 22, causing some heat to be conducted away from the underlayment 24, essentially wasting some heat energy. Finally, the underlayment 24 adds a substantial amount of weight to the structure.

In the second method, shown in FIG. 3, wood planks 30 are laid down on the subfloor 32, leaving gaps 34 in between. Metal, typically aluminum, brackets 36 with an inverted omega-shaped groove 40 are mounted to the planks 30 with the groove 40 within the gap 34. The pipe 38 is snapped into the groove 40 to secure it in place. The flooring 42 is laid over the planks 30. The omega-shaped groove 40 surrounds the pipe 38 to conduct heat into the bracket to provide greater area coverage and to at least partially uniformly disperse the heat from the pipes 38, similarly to the underlayment 24 of FIG. 2.

The main shortcoming of this method is that it is time-consuming to install. The planks must be placed with the correct gap, a time-consuming process. Then a large number of brackets must be secured to the planks, also a time-consuming process. Another shortcoming is that some heat is directed away from the flooring and into the subfloor. The brackets are mounted to the planks, which conduct some heat from the brackets, and the planks are mounted to the subfloor, again conducting heat from the planks and away from the flooring.

U.S. Pat. Nos. 5,292,065 and 5,579,996, issued to Fiedrich, disclose a method of modularizing the construction of the installation method of FIG. 3, saving much installation time. In these patents, two planks with a gap in between are attached in the underside by a spiked plate. The plank edges that form the gap are dadoed or beveled so that the pipe can be snapped into the gap and retained there. The modules (without the pipe) are nailed to the subfloor with the gaps forming the pattern for the pipe, the pipe is snapped into the gap, and the flooring is laid over the modules. Alternatively, a conductive sheet with a semi-round groove is inserted into the gap and the pipe is inserted into to the groove. The main shortcoming of this method is that the heat is not dispersed very uniformly unless the grooved conductors are used, which, like the omega-shaped brackets, are time-consuming to install. Another shortcoming is the weight of the modules. The modules are made relatively thin, limited to about ½ inch, in order to keep the weight down. This also means that the pipe inside diameter is limited to an inefficient ⁵⁄₁₆ inch so the pipe will fit. Also, the modules need to be kept relatively short, not longer than about five feet, otherwise they are too heavy, particularly if many of them have to be carried during the course of the day. Yet another shortcoming is that the process of manufacturing the module is time-consuming. The process has a number of steps, including cutting the wood, positioning the wood in proper relation to each other, and spiking the plate to the wood.

Thus there continues to be a need for a modularized approach to the installation of radiant heating systems that is fast, that provides uniform and efficient transfer of heat to the flooring, and that is efficient to manufacture.

SUMMARY OF THE INVENTION

An object of the present invention is to provide a heating pipe mounting plate that is a more efficient heat conductor.

Another object is to provide a heating pipe mounting plate that radiates heat relatively uniformly to the flooring.

A further object is to provide a heating pipe mounting plate that is simple to manufacture.

A further object is to provide a heating pipe mounting plate that is light in weight.

A further object is to provide a heating pipe mounting plate that is easy to install.

The present invention is mounting plate for securing the heating pipe of a radiant heat system to the subfloor. The basic plate is a flat sheet with a groove in the upper surface and a plurality of legs underneath. The preferred leg is perpendicular to the upper surface and elongated through the entire length of the plate. One advantage over the prior art is that the large air gaps between the legs act as an insulating air layer or can be filled with insulating material, raising the efficiency of the system.

The groove runs from one edge of the plate to another. The bottom of the groove is preferably semicircular, with a diameter the same as the outside diameter of the pipe. The goal is to have the groove wall make good mechanical contact with the pipe to maximum heat transfer from the pipe to the plate. The depth of the groove is preferably the same as the outside diameter of the pipe so that the pipe touches the underside of the flooring to maximize heat transfer. Optionally, a ridge running the length of the groove acts to retain the pipe in the groove so that the pipe must be snapped into the groove. Alternatively, the bottom of the groove is omega-shaped so that the pipe must be snapped into the groove.

Optionally, the plate may include a groove cap that sits on the pipe to completely surround the pipe with conductive material in order to maximum heat transfer. Alternatively, a heat-conductive potting material may be used to fill in the remainder of the space in the groove after the pipe is installed.

The present invention contemplates the use of special plates having groove paths that are not straight. For example, 90° and 180° bends for looping the heating pipes at obstacles, and other special shapes for complete solutions to small spaces, such as closets.

The plate is composed of a rigid and highly heat-conductive material. Preferred materials include highly heat-conductive metals, like aluminum, copper, and alloys thereof, or a composite designed to efficiently conduct heat. The most preferred materials are aluminum and aluminum alloys for several reasons. Aluminum has a high heat conductivity, is relatively inexpensive compared to other high heat conductivity metals, is light in weight relative to other high heat conductivity metals, and is particularly amenable to extrusion.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION

The present invention is a new mounting plate for securing the heating pipe of a radiant heat system to the subfloor.

Figure 4:
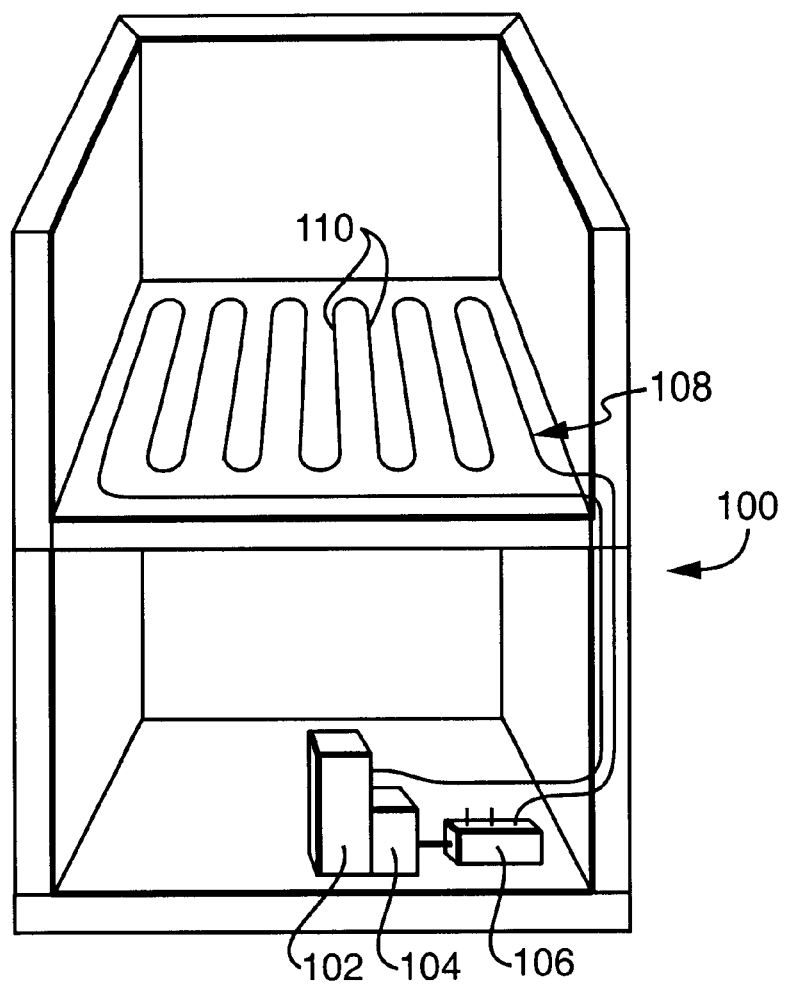
FIG. 4 is a diagram of a basic radiant heating system.

A typical radiant heating system 100 with which the present invention is used is shown in FIG. 4. The system 100 includes a boiler 102 used to heat the water, a pump 104 for pumping the water through the system 100, a manifold 106 for distributing the water to the various heating circuits, and the heating pipe 108, which radiates the heat into a room. All of the components are well-known in the industry. The typical heating pipe 108 is a heat-conductive flexible plastic. The pipe 108 is able to transfer the heat from the water flowing through the pipe 108 to the outer surface of the pipe 108 relatively efficiently. The inside diameter of the pipe 108 typically ranges from approximately ¼ to ½ inch and the outside diameter typically ranges from ⅜ to ⅝ inch, although smaller and larger pipes can be used.

The boiler 102, pump 104, and manifold 106 generally are located in the basement of the building. The pipe 108 runs from the manifold 106, to the room to be heated, and back to the boiler 102. There may be pipes different from the heating pipe carrying the water to and from the room. For example, it may be desirable to use an insulated pipe to carry the water from the manifold 106 to the room so that heat is not lost where it will not be productive.

The heating pipe 108 is laid out in a zigzag path to cover all areas of the room. The distance between loops 110 of the path depends on the size of the pipe 108 and the water temperature. For example, when using a pipe 108 having an outside diameter of ⅝ inch, the distance between loops 110 will be in the range of from six to twelve inches.

The basic plate 10 of the present invention is essentially a flat sheet 12 with a plurality of legs 14 and a linear groove 16. The upper surface 50 of the sheet 12 is flat. The legs 14 extend downwardly away from the sheet 12 to provide support and to space the upper surface 50 from the subfloor. The preferred leg 14 is a sheet generally perpendicular to the upper surface 50 and that extends the entire length of the plate 10. It is also contemplated that the leg 14 may not be a continuous sheet, but may be broken periodically along the length of the plate 10. It is also contemplated that the legs 14 extend across the width of the plate 10 and/or along diagonals, as well as or instead of along the length.

The number of legs 14 will depend on several factors with conflicting purposes. The area of the bottoms 52 of the legs 14 that contacts the subfloor 90 should be minimized in order to minimize the amount of heat conducted to the subfloor 90 and away from the flooring 92. On the other hand, the bottoms 52 need to be large enough to provide adequate support to prevent the upper surface 50 of the plate 10 from sagging. The area necessary depends upon the material of which the plate 10 is composed and the thickness of the upper sheet 12. The preferred materials, aluminum and aluminum alloys, are relatively rigid and robust, so thin legs, like those shown in the figures, are adequate.

The height of the legs 14 is dependent upon the size of the heating pipe 96, which sits in the groove 16 below the upper surface 50 of the plate 10. The minimum height for the legs 14 is the depth of the groove 16 plus the thickness of the plate 10 at the groove bottom 64.

Figure 5:
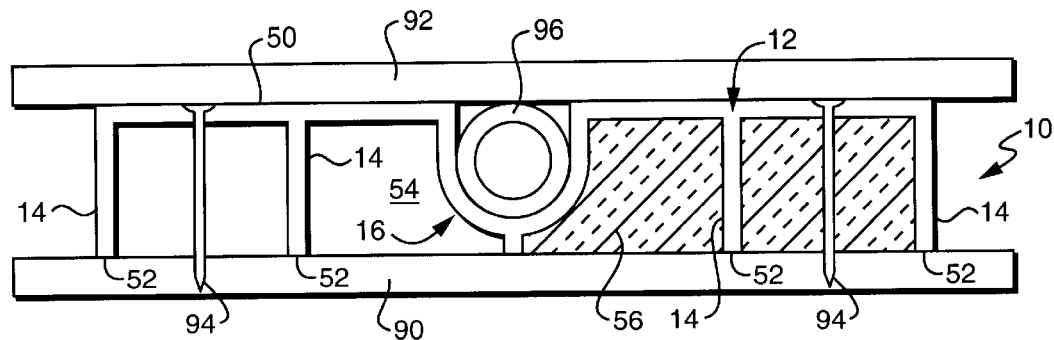
FIG. 5 is an end view of the mounting plate of FIG. 1 installed.

One advantage that the present invention has over the prior art is that the legs 14 form large air gaps 54 between the lower surface of the plate sheet 12 and the subfloor 90. The air gaps 54 can be left empty as an insulating layer, as in the left side of FIG. 5. Alternatively, the gaps 54 can be filled with insulating material 56, either during manufacture or during installation, as in the right side of FIG. 5. This can dramatically decrease heat transfer from the plate 10 to the subfloor 90, raising the efficiency of the system.

Figure 6:
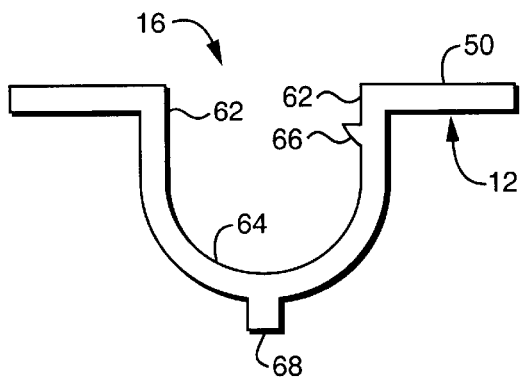
FIG. 6 is a detailed end view of the groove.

The groove 16 runs from one edge 44 of the plate 10 to another edge 44. In the basic plate 10, the groove 16 runs between opposite edges 58 over the length of the plate 10. As seen in FIG. 6, the upper portion of the groove 16, the portion that is adjacent to the upper surface 50 of the plate 10, is composed of two parallel walls 62 perpendicular to the upper surface 50. The bottom 64 of the groove 16 is preferably semicircular, with a diameter that is at least as large as the outside diameter of the pipe that it is intended to be used with. However, it must be small enough so that the pipe maintains a good mechanical contact with the pipe to maximize heat transfer from the pipe to the plate 10. The semicircular bottom 64 contacts the pipe along approximately one half of the circumference of the pipe. The present invention also contemplates that the bottom circularity may extend over more than 180°, for example, the shape of FIG. 7.

The depth of the groove 16 is preferably the same as the outside diameter of the pipe so that the pipe does not extend above the plate upper surface 50, but does contact the bottom of the flooring in order to maximize heat transfer from the pipe to the flooring. The groove depth may be greater than the outside diameter of the pipe. However, heat transfer from the pipe to the flooring is not maximized if the top of the pipe is not in contact with the flooring.

Optionally, there is a ridge 66 that runs the length of the groove 16. The ridge 66 acts to retain the pipe in the groove by narrowing the width of the groove 16 slightly so that the pipe must be snapped into the groove 16. The ridge 66 is located on one of the parallel walls 62 in a position just above the semicircular groove bottom 66 such that it holds the pipe against the bottom 64 of the groove 16. Optionally, there is a second ridge on the other parallel wall.

Figure 7:
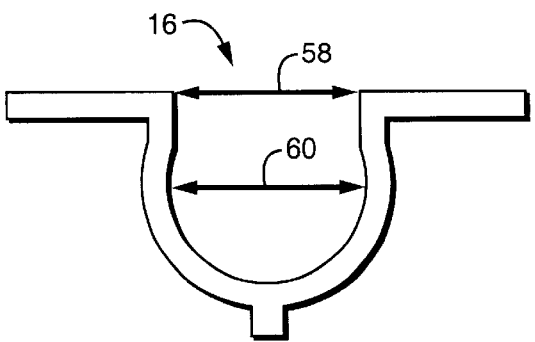
FIG. 7 is an end view of an alternate configuration of the groove.

Alternatively, the groove 16 is omega-shaped, that is, the groove opening 58 is narrower than the diameter 60 of the circular groove bottom, as in FIG. 7. This has the effect of needing to snap the pipe into the groove 16 and securing the pipe in the groove 16. It also provides a slightly greater area of contact with the pipe.

Optionally, and if the outside height of the groove 16 is less than the height of the legs 14, the groove 16 has a foot 68 that extends the external height of the groove 16 to the same as the height of the legs 14. This allows the groove 16 to act as another leg for more secure footing. It also provides a brace for the groove 16 so that the plate 10 cannot sag at the groove 16.

Figure 8:
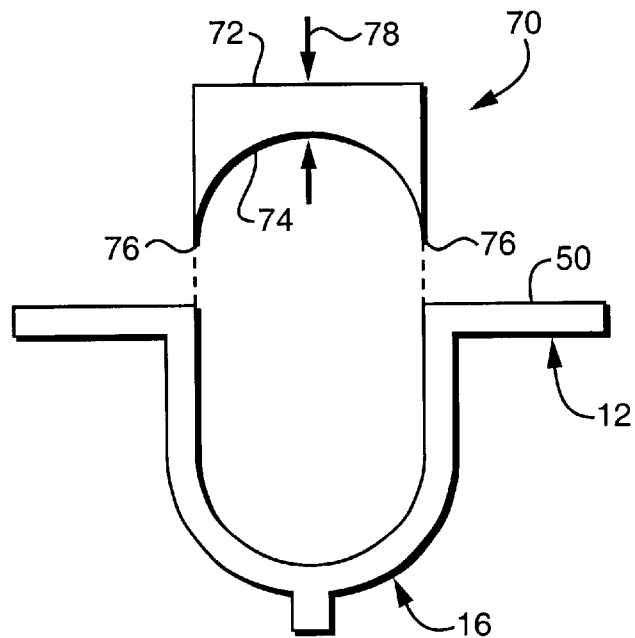
FIG. 8 is an end view of one embodiment of the end cap.
Figure 9:
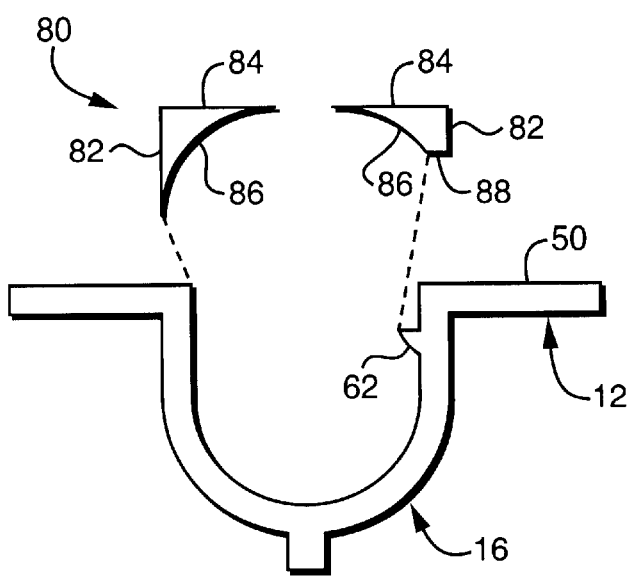
FIG. 9 is an end view of a second embodiment of the end cap.

Optionally, the plate 10 may include a groove cap 18, which may be comprised of a single part, as in FIG. 8, or two parts, as in FIG. 9. The top 72 of the single-part cap 70 is flat so that, when it is installed, the upper surface 50 of the plate 10 shows a substantially continuous flat surface. The underside 74 of the single-part cap 70 is semicircular, with a diameter that is the same as the outside diameter of the pipe. If the groove 16 includes one or two lips 62, the lower edges 76 of the single-part cap 70 is beveled to accommodate. The groove 16 must be deeper than when a single-part cap 70 is not used, the extra depth being the height of the narrow center 78 of the single-part cap 70, so that the cap top 72 will be contiguous with the upper surface 50.

The two-part cap 80 does not require that the groove 16 be deeper, as does the single-part cap 70. The two parts 82 of the two-part cap 80 are mirror images of each other. The top 84 of the part 82 is flat so that, when both parts 82 are installed, the upper surface 50 of the plate 10 shows a substantially continuous flat surface. The underside 86 of the part 82 is a quarter circle, with a radius that is the same as the outside radius of the pipe. If the groove 16 includes one or two lips 62, the lower edge of the parts 82 are beveled to accommodate, as at 88.

When the cap 18 is installed, it provides a greater heat transfer from the pipe by completely surrounding the pipe with high-heat transfer material, increasing the energy efficiency of the heating system.

As an alternative to the groove cap 18, a heat-conductive potting material can be used. After the pipe is installed in the groove 16, the potting material is poured along the sides of the pipe to fill in the groove 16. After the potting material sets, it conducts heat from the top of the pipe to the plate, providing greater efficiency in operation.

Various dimensions of the mounting plate 10 depend, either directly or indirectly, upon the dimensions of the heating pipe 96. For example, the width of the groove 16 direct dependents on the heating pipe diameter. In order for the heating pipe 96 to fit snugly, the inside width of the groove 16 is the same as the outside diameter of the heating pipe 96.

The height of the mounting plate 10 depends upon the size of the pipe 96 because the groove 16 cannot fall below the end of the legs 14 and the pipe 96 must sit below the upper surface 50 of the plate. Thus the minimum height of the plate 10 is the sum of the outside diameter of the pipe 96 and the thickness of the plate 16 at the bottom of the groove 16.

The width of the plate 10 depends upon the size of the heating pipe 96. Larger diameter pipes radiate more heat, which can cover a larger area. So the loops of the pipe path can be spaced farther apart. The width of the plate 10 is approximately the same as but no greater than the distance between loops of the pipe path, and may be less. This is assuming that the groove 16 bisects the length of the plate 10. However, the present invention contemplates that the groove 16 may be offset from the center of the plate 10, so that it is closer to one side of the plate 10 than the other.

One issue about the width of the plate 10 concerns the expansion and contraction of the plate 10 during heating and cooling. The preferred materials will expand a small amount as the plate 10 heats up. Thus, there should be space between the plates 10 that they can expand into. The space may be left empty or may be filled with a resilient material that can conduct heat between the plates 10.

The thickness of the plate 10 depends on the material with which the plate is composed. The stronger the material, the thinner the plate 10 can be. For plates 10 made from extruded aluminum, the plate thickness will be on the order of $1/16$ inch.

The length of the plate 10 depends on the desired maximum weight of the plate 10 so that it can be carried to the work site. The device of Fiedrich is composed mostly of sheets of wood between ½ and ¾ inches thick, making the device rather heavy in lengths greater than three or four feet. When the mounting plate of the present invention is composed of the preferred aluminum materials, it is much lighter than the device of Fiedrich, and can be made is greater lengths and widths. The longer the plates are, the fewer plates are needed to be positioned and secured. It is contemplated that the plates 10 will be made in a series of standard lengths, for example, in one-foot increments up to six feet. Any of the standard lengths can be cut shorter for particular applications.

The present invention contemplates the use of special plates having groove paths that are not straight. The groove 16 of all of these special shapes have the same cross-sectional structure as the groove 16 of the basic plate 10.

Figure 10:
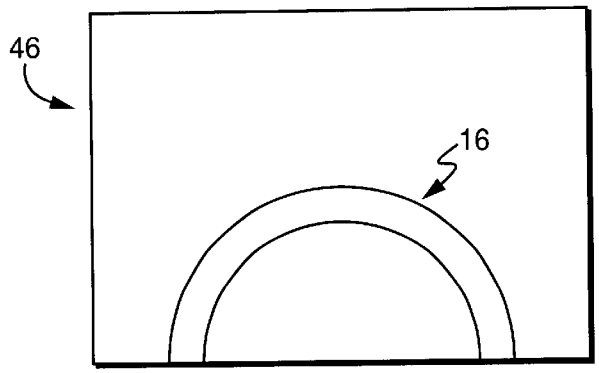
FIG. 10 as a top view of a half round end mounting plate.
Figure 11:
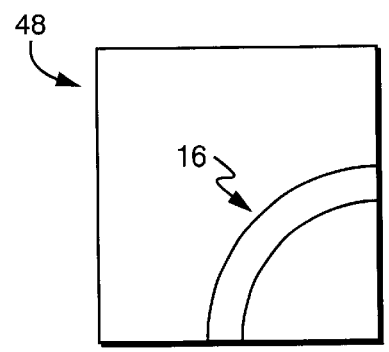
FIG. 11 as a top view of a quarter round end mounting plate.

Two of the special shapes are end plates, the half round end plate 46, shown in FIG. 10 and the quarter round end plate 48, shown in FIG. 11. When the heating pipe reaches a wall, the pipe is looped 180°. The diameter of the loop is the same as the preferred distance between the parallel loops of the pipe layout. The half round end plate 46 provides a single complete solution to curving the pipe 180°. The quarter round end plate 48 provides a more modular solution by providing a 90° bend. Two quarter round end plates 48 can be abutted to make a 180° end. Quarter round end plates 48 can be abutted to form other pathways, for example, a double S shape to route around a support beam.

Figure 12:
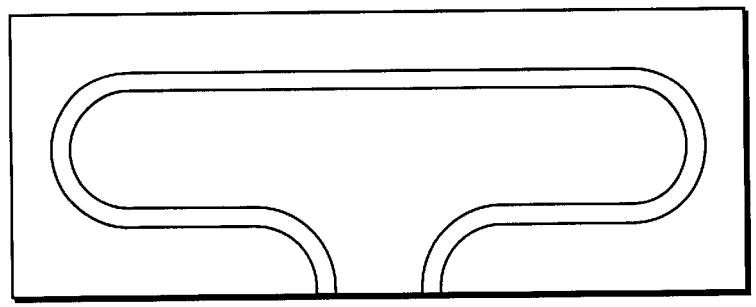
FIG. 12 is a top view of an example special path plate for a small enclosed space.

The present invention contemplates that there may be plates with other groove paths, for example, bends other than 90° and 180° and special paths for complete solutions to small spaces, such as closets. An example of such a special path plate is shown in FIG. 12.

Figure 1:
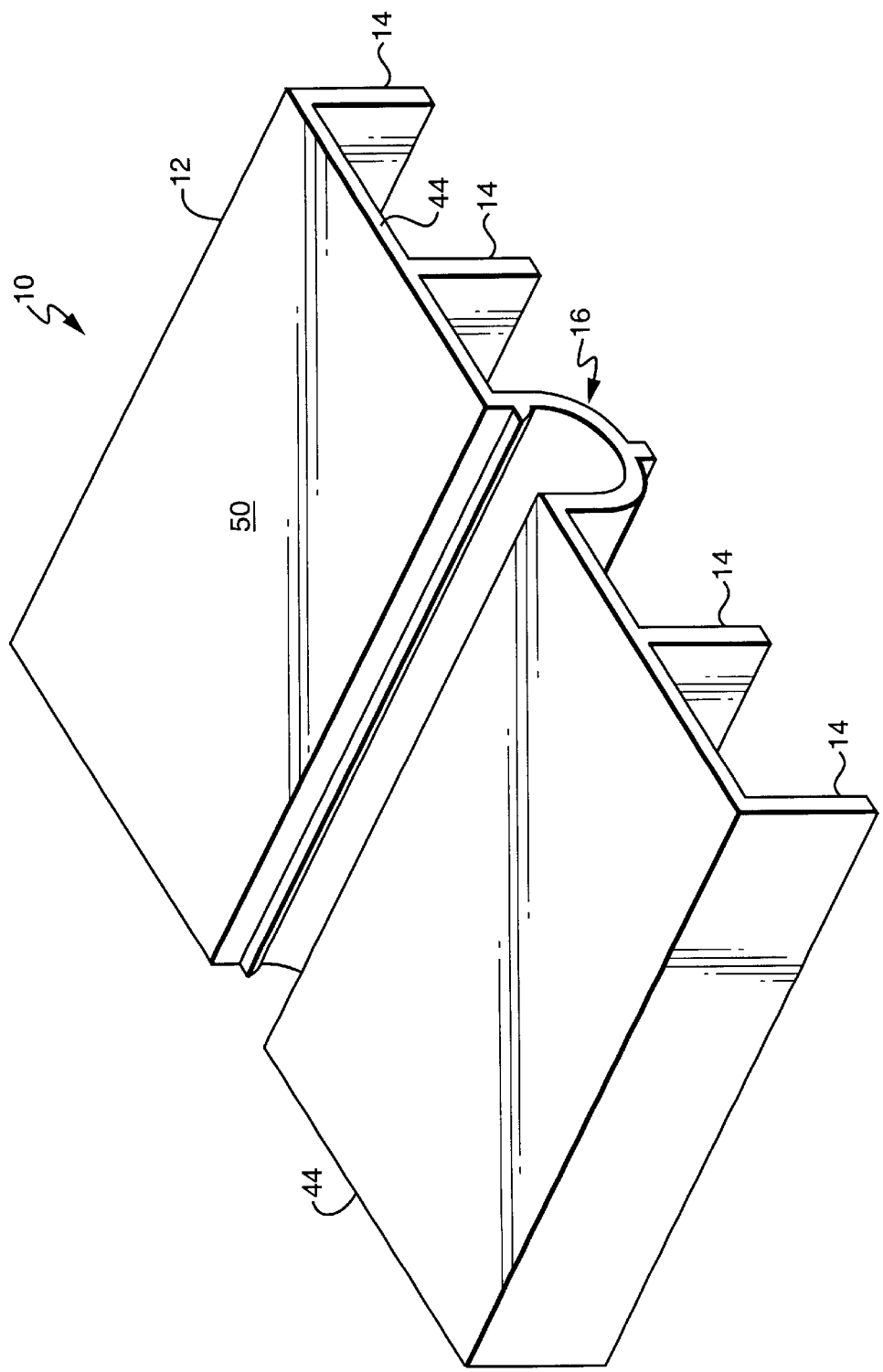
FIG. 1 is a perspective view of the mounting plate of the present invention.
Figure 2:
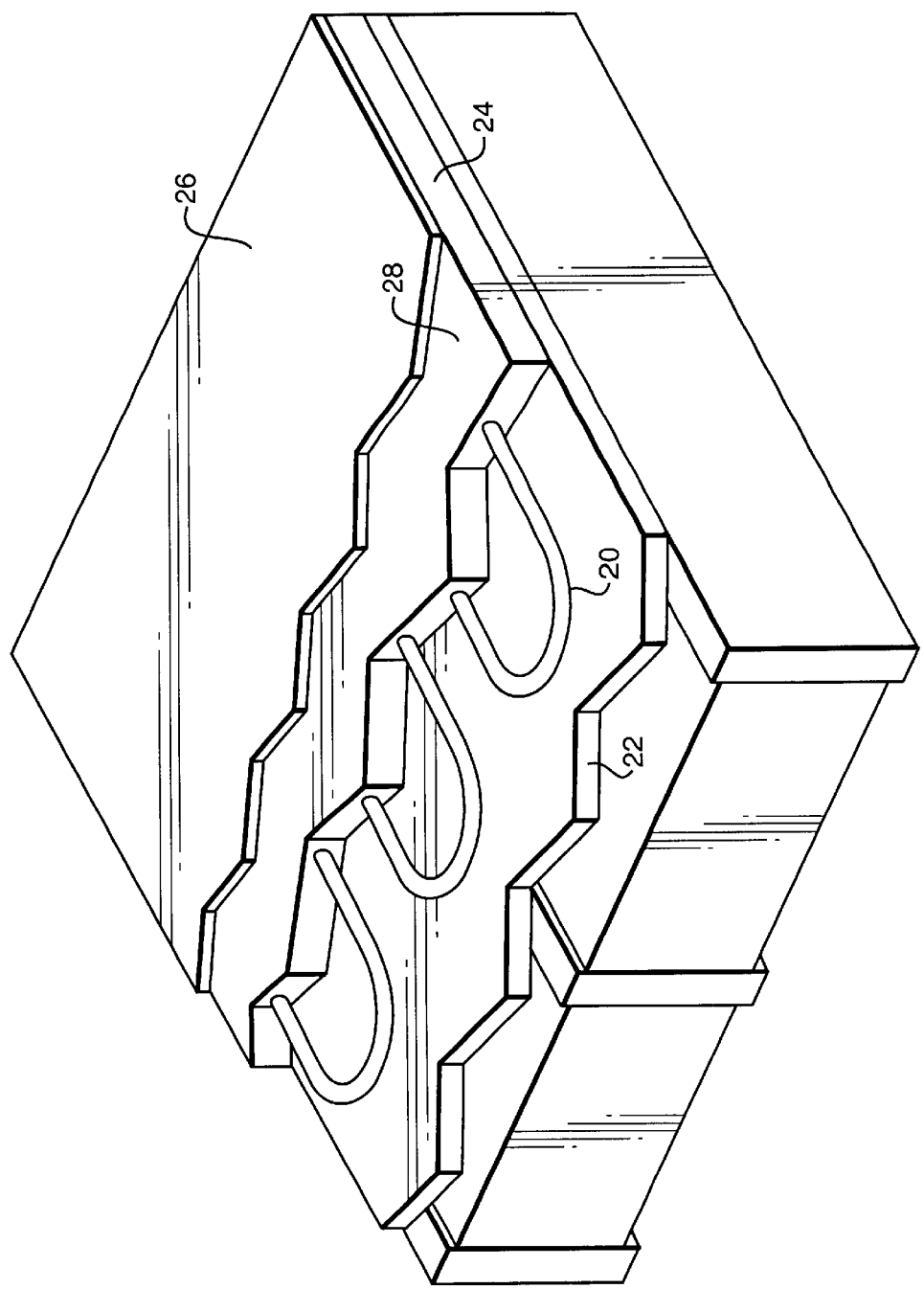
FIG. 2 is a cutaway diagram showing one method of the prior art of installing radiant heat pipes.
Figure 3:
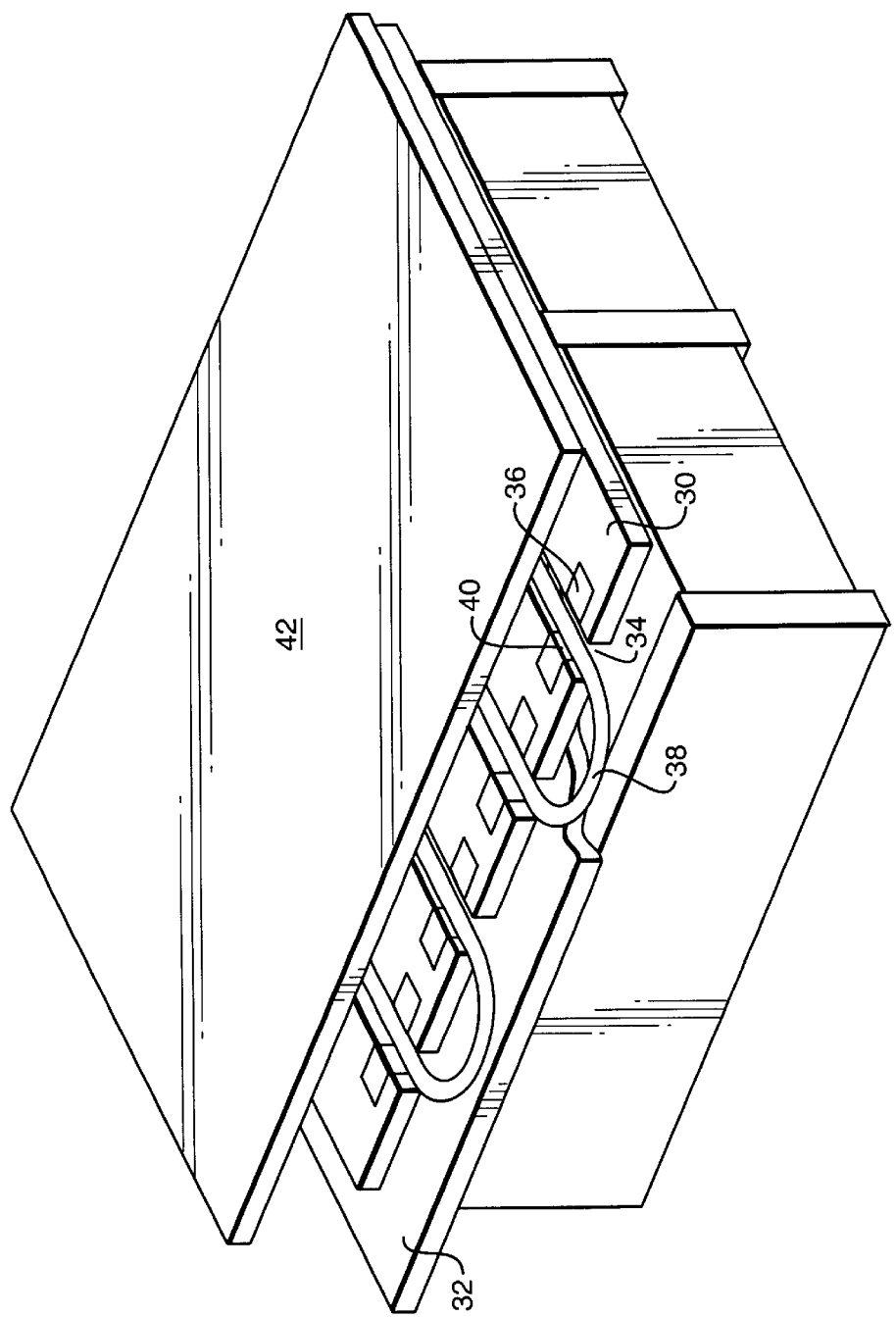
FIG. 3 is a cutaway diagram showing another method of the prior art of installing radiant heat pipes.

The material of which the plate 10 is substantially composed is rigid and highly heat-conductive. Preferred materials include metals, like aluminum, copper, and alloys thereof, or a composite designed to efficiently conduct heat. Plate is preferably composed of aluminum and/or an aluminum alloy for several reasons. First, aluminum has a high heat conductivity. Heat from the heating pipe disperses relatively quickly and uniformly. Second, aluminum is relatively inexpensive compared to other high heat conductivity metals, such as copper. Third, aluminum is light in weight relative to other high heat conductivity metals. Fourth, aluminum is particularly amenable to extrusion, the process by which the metal is forced through a shaped opening. The only real concession to the use of extrusion is that the legs 14 are preferably parallel to the groove 16, as FIG. 1. Unfortunately, some plates are not amenable to extrusion, particularly the end plates 70, 80 with the quarter round or semicircular groove. These plates are typically formed by casting or pressing.

The mounting plates 10 of the present invention are installed as part of the installation process for the radiant heating system. The system can be installed in walls and ceilings as well as floors, in which case the installation process is adapted appropriately. The plates 10 are laid out on the subfloor 90 so that the grooves 16 trace the path to be followed by the pipe 96, making sure that the grooves 16 are aligned. The plates 10 are permanently attached to the subfloor 90 by screws, nails, or other means, as at 94. With the preferred plate dimensions, the typical nail gun used for building construction has enough power for a nail to penetrate the mounting plate. If rolled insulation 56 is being used, it is laid down with the plates 10. After the plates are in place, the heating pipe 96 is pressed into the grooves 16, after which the groove cap 70, 80 or potting, if used, is installed. Finally, the flooring 92 is installed over the mounting plates 10.

Thus it has been shown and described a mounting plate for use with a radiant heating system which satisfies the objects set forth above.

Since certain changes may be made in the present disclosure without departing from the scope of the present invention, it is intended that all matter described in the foregoing specification and shown in the accompanying drawings be interpreted as illustrative and not in a limiting sense.

What is claimed is:

1. A plate adapted for use in a radiant heating system, said system comprising a boiler, a pump, a supply pipe, a return pipe, and a flexible heating pipe having an outside diameter and a circumference, said plate comprising:

(a) a sheet having a substantially flat upper surface, a lower surface, a plurality of edges, and a thickness, said sheet being substantially composed of a high heat conductivity material;

(b) a groove in said upper surface, said groove extending between two of said edges and being adapted to receive said heating pipe and to provide secure mechanical contact with at least approximately one half said circumference of said heating pipe, said groove having a bottom with a depth that is at least the same as said heating pipe outside diameter; and (c) a plurality of legs extending from said lower surface a distance of at least said groove depth plus said sheet thickness at said groove bottom.

2. The plate of claim 1 wherein said groove bottom is at least semicircular with a diameter substantially the same as said heating pipe outside diameter.

3. The plate of claim 1 wherein said groove has a depth substantially the same as said heating pipe outside diameter.

4. The plate of claim 1 wherein said groove includes a ridge for retaining said pipe in said groove.

5. The plate of claim 1 wherein said groove is omega-shaped.

6. The plate of claim 1 wherein said legs are elongated and parallel to said groove.

7. The plate of claim 1 wherein said plate includes an insulating material adjacent to said plate lower surface and said legs.

8. The plate of claim 1 wherein said plate is substantially composed of a material selected from the group consisting of aluminum and aluminum alloys.

9. A plate adapted for use in a radiant heating system, said system comprising a boiler, a pump, a supply pipe, a return pipe, and a flexible heating pipe having an outside diameter and a circumference, said plate comprising:

(a) a sheet having a substantially flat upper surface, a lower surface, a plurality of edges, and a thickness, said sheet being substantially composed of a material selected from the group consisting of aluminum and aluminum alloys;

(b) a groove in said upper surface, said groove extending between two of said edges and being adapted to receive said heating pipe and to provide secure mechanical contact with at least approximately one half said circumference of said heating pipe, said groove having a bottom that is at least semicircular with a diameter substantially the same as said heating pipe outside diameter, said groove having a depth that is substantially the same as said heating pipe outside diameter; and (c) a plurality of legs extending from said lower surface a distance of at least said groove depth plus said sheet thickness at said groove bottom, said legs being elongated and parallel to said groove.

10. The plate of claim 9 wherein said groove includes a ridge for retaining said pipe in said groove.

11. The plate of claim 9 wherein said groove is omega-shaped.

12. The plate of claim 9 wherein said plate includes an insulating material adjacent to said plate lower surface and said legs.

13. A radiant heating system comprising:

(a) a boiler for heating water;

(b) heating pipe having an outside diameter and a circumference;

(c) a supply pipe supplying said water from said boiler to said heating pipe;

(d) a return pipe returning said water from said heating pipe to said boiler;

(e) a pump for circulating said water through said boiler, said supply pipe, said heating pipe, and said return pipe;

(f) a plate for mounting said heating pipe to a surface;

(g) said plate having a substantially flat upper surface, a lower surface, a plurality of edges, and a thickness, said sheet being substantially composed of a high heat conductivity material;

(h) said plate having a groove in said upper surface, said groove extending between two of said edges and being adapted to receive said heating pipe and to provide secure mechanical contact with at least approximately one half said circumference of said heating pipe, said groove having a bottom with a depth that is at least the same as said heating pipe outside diameter; and (i) said plate having a plurality of legs extending from said lower surface a distance of at least said groove depth plus said sheet thickness at said groove bottom.

14. The radiant heating system of claim 13 wherein said groove bottom is at least semicircular with a diameter substantially the same as said heating pipe outside diameter.

15. The radiant heating system of claim 13 wherein said groove has a depth substantially the same as said heating pipe outside diameter.

16. The radiant heating system of claim 13 wherein said groove includes a ridge for retaining said pipe in said groove.

17. The radiant heating system of claim 13 wherein said groove is omega-shaped.

18. The radiant heating system of claim 13 wherein said legs are elongated and parallel to said groove.

19. The radiant heating system of claim 13 wherein said plate includes an insulating material adjacent to said plate lower surface and said legs.

20. The radiant heating system of claim 13 wherein said plate is substantially composed of a material selected from the group consisting of aluminum and aluminum alloys.

21. A radiant heating system comprising:

(a) a boiler for heating water;

(b) heating pipe having an outside diameter and a circumference;

(c) a supply pipe supplying said water from said boiler to said heating pipe;

(d) a return pipe returning said water from said heating pipe to said boiler;

(e) a pump for circulating said water through said boiler, said supply pipe, said heating pipe, and said return pipe;

(f) a plate for mounting said heating pipe to a surface;

(g) said plate having a sheet having a substantially flat upper surface, a lower surface, a plurality of edges, and a thickness, said sheet being substantially composed of a material selected from the group consisting of aluminum and aluminum alloys;

(h) said plate having a groove in said upper surface, said groove extending between two of said edges and being adapted to receive said heating pipe and to provide secure mechanical contact with at least approximately one half said circumference of said heating pipe, said groove having a bottom that is at least semicircular with a diameter substantially the same as said heating pipe outside diameter, said groove having a depth that is substantially the same as said heating pipe outside diameter; and (i) said plate having a plurality of legs extending from said lower surface a distance of at least said groove depth plus said sheet thickness at said groove bottom, said legs being elongated and parallel to said groove.

22. The radiant heating system of claim 21 wherein said groove includes a ridge for retaining said pipe in said groove.

23. The radiant heating system of claim 21 wherein said groove is omega-shaped.

24. The radiant heating system of claim 21 wherein said plate includes an insulating material adjacent to said plate lower surface and said legs.

* * * * *